United States Patent [19]
Drucktenhengst et al.

[11] Patent Number: 5,645,283
[45] Date of Patent: Jul. 8, 1997

[54] RADIAL SHAFT SEAL HAVING DUST LIP WITH NOTCHES

[75] Inventors: Rolf Drucktenhengst, Lampertheim; Rolf Vogt, Oftersheim, both of Germany

[73] Assignee: Carl Freudenberg, Weinheim, Germany

[21] Appl. No.: 640,994

[22] Filed: Apr. 30, 1996

[30] Foreign Application Priority Data

May 20, 1995 [DE] Germany .................. 195 18 577.3

[51] Int. Cl.⁶ .................................................. F16J 15/34
[52] U.S. Cl. ...................... 277/153; 277/134; 277/152; 277/29
[58] Field of Search ........................ 277/134, 152, 277/153, 29

[56] References Cited

U.S. PATENT DOCUMENTS

| | | | |
|---|---|---|---|
| 3,807,743 | 4/1974 | Barhe | 277/134 |
| 5,004,248 | 4/1991 | Messenger et al. | 277/153 |
| 5,511,886 | 4/1996 | Sink | 277/134 |

*Primary Examiner*—William A. Cuchlinski, Jr.
*Assistant Examiner*—Christina Annick
*Attorney, Agent, or Firm*—Furgang & Milde, LLP

[57] ABSTRACT

A radial shaft seal comprises a gasket and an anti-dust lip made of polymer and resting axially separated against the shaft with concentric sealing edges around it. The anti-dust lip has at least two sealing edges separated by a gap. Each edge is interrupted by at least one groove that opens toward the shaft at points distributed around the seal circumference.

8 Claims, 2 Drawing Sheets

RADIAL SHAFT SEAL HAVING DUST LIP WITH NOTCHES

BACKGROUND OF THE INVENTION

The present invention concerns a radial shaft seal comprising a gasket and anti-dust lip made of polymer and resting axially separated against the shaft and with continuous sealing edges around it.

Such a radial shaft seal is known from the published German patent application No. 1,284,203. Its tightness derives from a fluid being constantly supplied to the space being sealed from below the sealing edge as the shaft rotates. To prevent a vacuum between the sealing lip and the anti-dust lip that would force them too strongly against the surface of the rotating shaft, the space between the lips communicates through a vent with the space being sealed off. It must of course be taken into account that the fluid being sealed out, lubricating oil for example, can penetrate through the vent into the space between the lips, and leak out past the anti-dust lip while the shaft is not rotating. The result is more dust outside the anti-dust lip, which not only looks bad, but also increases wear on the lip as the shaft begins to rotate again.

SUMMARY OF THE INVENTION

The object of the present invention is accordingly to provide a radial seal that will seal off both a rotating and a stationary shaft better, while occasioning less wear than seals of the prior art.

This object, as well as other objects which will become apparent from the discussion that follows, are attained, in accordance with the present invention, by a seal of the aforesaid type wherein the anti-dust lip has at least two sealing edges separated by a gap and wherein each sealing edge is interrupted by at least one groove that opens toward the shaft at points distributed around the circumference. The space between the sealing lip and the anti-dust lip will accordingly be supplied with air without any increase in the deposits of dust or oil. The seal will accordingly be absolutely tight whether the shaft is rotating or still, and no oil or other contaminants will be apparent outside the anti-dust lip. Wear and braking action on the rotating shaft will also be considerably decreased.

The radial shaft seal in accordance with the present invention can be conventionally molded or injection molded. Sealing material can be molded directly around an annular reinforcement and cured onto it. The grooves that interrupt the sealing edges can be produced simultaneously, without extra steps or complicated special tools. The radial shaft seal in accordance with the present invention is accordingly less expensive to produce than known seals.

The air supplied to the sealing edge through the grooves while the machinery is in operation will be diverted several times as it travels through the grooves and initial gaps, and it will be practical to direct it through cross-sections of different dimensions. From the sealing-engineering aspect the result will be a labyrinth, which will extensively exclude the penetration of particles of dust. The basic effect of the anti-dust lip, which is to protect the sealing lip from dust, will accordingly remain essentially unaffected. It has turned out to be particularly practical in this context for the anti-dust lip to have several gaps separated by sealing edges.

An auxiliary sealing lip can be positioned upstream of the anti-dust lip, facing the primary sealing lip. The auxiliary sealing lip can have a sealing strip that wraps tightly around the shaft. The auxiliary sealing lip can be separated from the primary sealing lip by a second space. The primary sealing lip, which is responsible for the seal as such, will accordingly be protected from dust, and the seal will be even more effective.

The primary sealing lip and the auxiliary sealing lip can each have another sealing edge. These edges can consist of two intersecting conical surfaces. The surfaces are oriented toward each other and toward the surface of the shaft such as to ensure resilience toward the space being sealed off. The conical surface facing the sealed off space is for this purpose at a steeper angle to the axis of the seal than is the conical surface facing the atmosphere. Hydrodynamically active fluid-recirculating components exerting a forwarding action toward the space being sealed off and positioned on the conical surface of the primary sealing lip facing the auxiliary sealing lip have been demonstrated as practical to increase the resilience, which is of advantage in preventing leaks. The fluid recirculating components can for example be sine wave shaped, turbulence generating ribs extending along the circumference of the conical surface.

Packing the second space with grease has been demonstrated as practical to ensure adequate lubrication of the primary sealing lip in critical operating conditions.

The initial sealing edges of the anti-dust lip can also consist of two intersecting conical surfaces oriented toward each other and toward the surface of the shaft such as to ensure resilience toward the atmosphere. The contour of the conical surface facing the atmosphere must for this purpose be at a greater angle to the axis of the seal than the conical surface facing the space to be sealed. This approach will prevent particles of dust from the environment from penetrating into the space between the anti-dust lip and the primary sealing lip.

The angle bisectors of the conical surfaces demarcating the initial sealing edges of the anti-dust lip must slope, relative to the angle bisectors of the conical surfaces demarcating the sealing edge of the primary sealing lip and the sealing edge of the auxiliary sealing lip, if any, in the opposite direction of the longitudinal axis of the shaft. This feature takes into account the direction along which the sealing action is intended to occur in the vicinity of the individual sealing edges.

The present invention will now be specified with reference to the accompanying drawings.

DESCRIPTION OF THE PREFERRED EMBODIMENT

Figure 1:
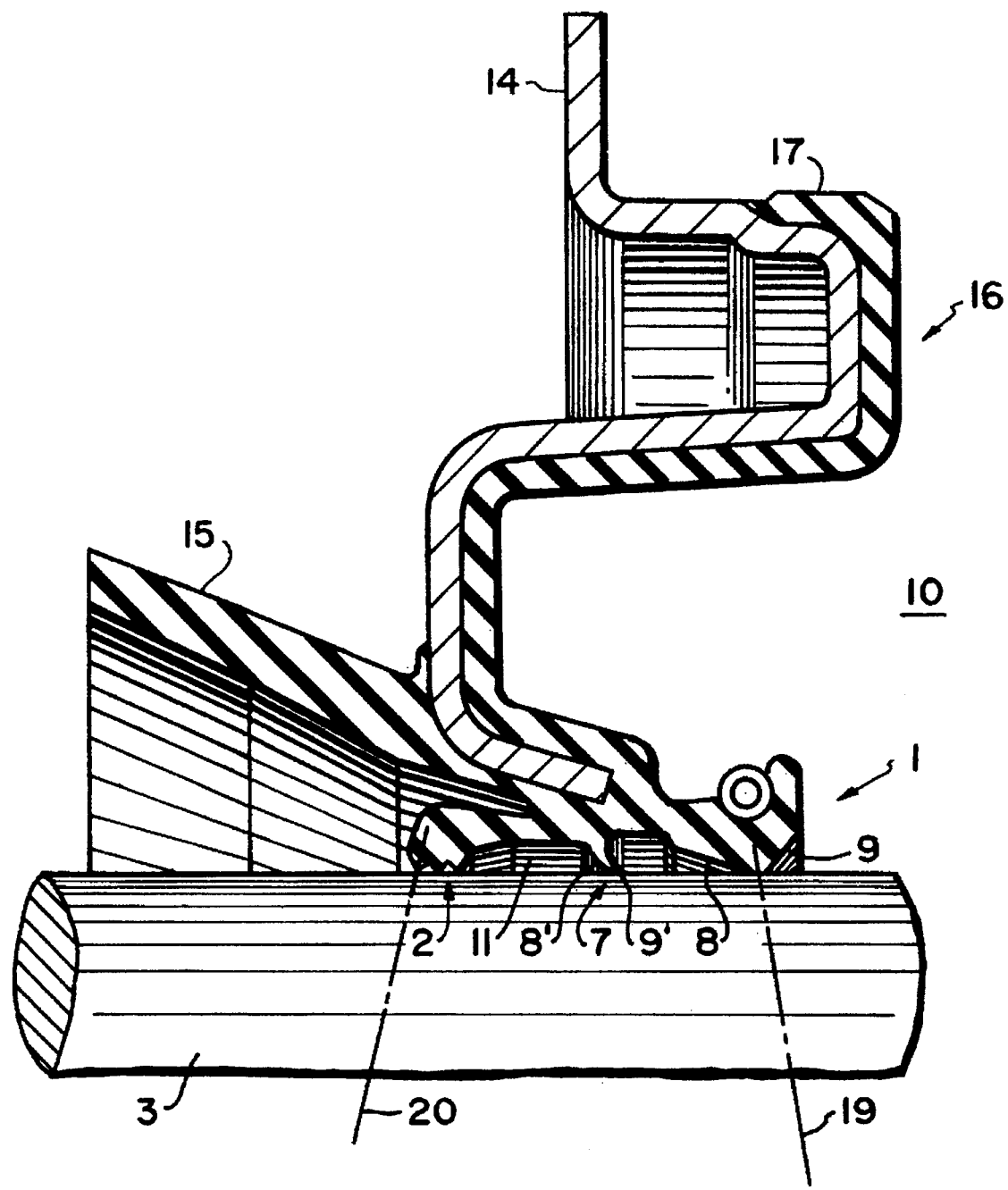
FIG. 1 is a partly sectional illustration of the preferred embodiment of a radial shaft seal in accordance with the present invention.

The radial shaft seal illustrated in FIG. 1 comprises an annular reinforcement 14 of deep-drawn steel with a gasket 16 of resilient material vulcanized directly around it. In use, the seal fits snugly in the annular gap between a bore and a shaft 3 that extends concentrically through it. The seal is demarcated from the bore by a static sealing zone 17 and is maintained in radial alignment by direct contact between the annular reinforcement 14 and the cylindrical shaft. The inner surface of seal 16 is provided with several axially distributed annular subsidiary seals 1, 7, 2, and 15 that, when the machinery is in operation, engage and seal relatively rotating components, which are incompletely illustrated. Subsidiary seal 15 is between the other subsidiary seals and the environment. Outermost subsidiary seal 15 is intended to keep coarse contaminants away from an anti-dust lip 2.

Figure 2:
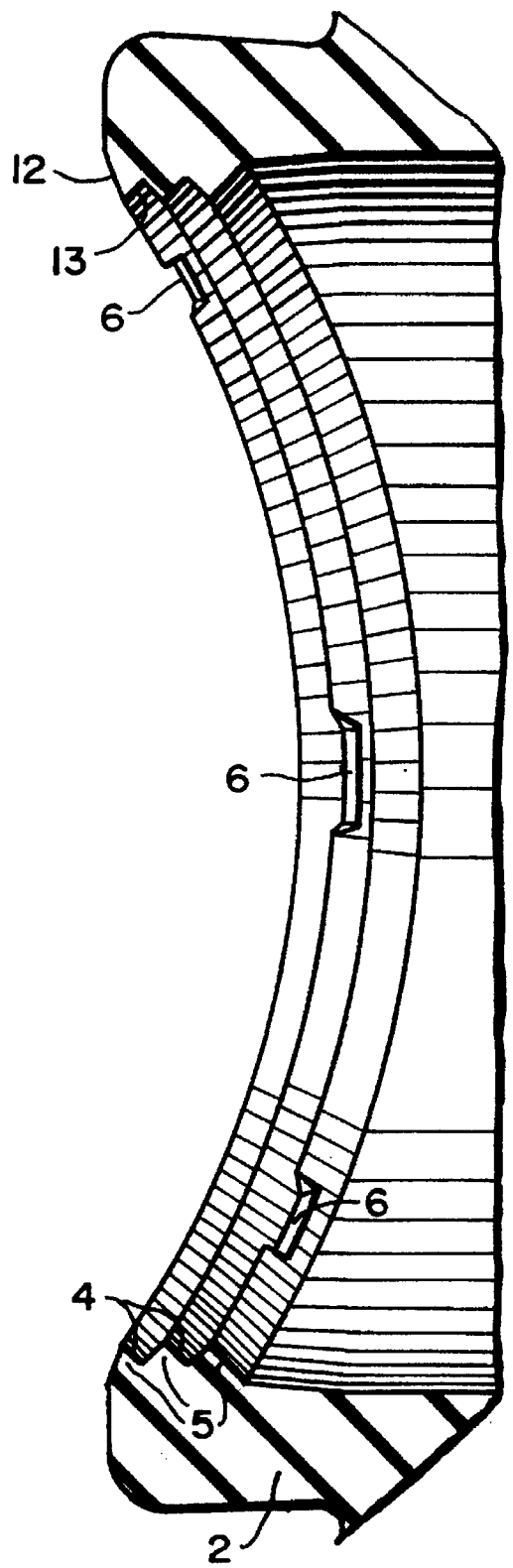
FIG. 2 is a partly sectional illustration of the shaft seal of FIG. 1 in the vicinity of the sealing lip and antidust lip.

The anti-dust lip 2 has, as illustrated in FIG. 2, three sealing edges 5 separated by gaps 4. Sealing edges 5 are interrupted by at least one groove 6. Grooves 6 are distributed at points around the circumference of anti-dust lip 2 and open toward the shaft 3. As may be seen in FIG. 2, no two grooves are arranged at a common circumferential point. Each groove 6 is narrower than gaps 4. When the machinery is in operation, air flows through grooves 6 and the gaps 4 adjacent thereto toward the side facing the sealing lip 1. Because the grooves are not aligned with each other, it is impossible for the dust impacting the anti-dust lip from outside to penetrate all the way through that lip. Outstanding ventilation of the space 11 between the anti-dust lip 2 and the sealing lip 1 is accordingly ensured.

No vacuum can accordingly occur in the space 11 while the shaft 3 is rotating, which would cause an and increase in the pressure of sealing lip 1 and anti-dust lip 2 against the surface of the shaft. The space 11 is packed with grease to facilitate the groove action of the sealing lip 1. Between the sealing lip 1 and the anti-dust lip 2 is an auxiliary sealing lip 7. The primary sealing lip 1 and the auxiliary. sealing lip 7 each having a sealing edge consisting of two intersecting conical surfaces 8, 9 and 8', 9', respectively the conical surface 8 of the sealing lip 1 facing the auxiliary sealing lip 7 is provided with a hydrodynamic fluid-recirculating components 18 that exert a forwarding action toward the sealed space 10 while the shaft 3 is rotating. The fluid, lubricanting oil for example, that flows past the primary sealing lip 1 and is intended to be sealed off will accordingly be recirculated back to the sealed space 10 as the shaft rotates. The angle bisector 19 of the conical surfaces 8 and 9 that demarcate the slope of the sealing edge of the sealing lip 1 are oriented in the opposite direction, relative to the longitudinal axis of the shaft, as compared to the angle bisectors 20 of the conical surfaces 12 and 13 (FIG. 2) that demarcate the slope of the sealing edges, of the anti-dust lip. The result, in spite of grooves 6, is a slight outward forwarding action in the vicinity of the anti-dust lip and a forwarding action away from the space to be sealed toward the gap being sealed in the vicinity of both the auxiliary sealing lip 7 and the primary sealing lip 1 as shaft 3 rotates.

The radial shaft seal disclosed herein is particularly appropriate for sealing shafts that are exposed to considerable dust during regular use.

There has thus been shown and described a novel radial shaft seal which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. A radial shaft seal comprising a primary sealing lip surrounding the shaft and an anti-dust lip surrounding the shaft and axially separated from the primary sealing lip, the anti-dust lip having at least two first sealing edges separated by a gap with each sealing edge interrupted by at least one groove that opens toward the shaft at points distributed around the seal circumference such that no two grooves are arranged at a common point.

2. The seal defined in claim 1, wherein the anti-dust lip has three sealing edges.

3. The seal defined in claim 1, further comprising an auxiliary sealing lip surrounding the shaft and positioned between the anti-dust lip and the primary sealing lip, wherein the auxiliary sealing lip is separated from the primary sealing lip by an intermediate space.

4. The seal defined in claim 3, wherein the primary sealing lip and the auxiliary sealing lip have second sealing edges that consist of two intersecting conical surfaces.

5. The seal defined in claim 4, with hydrodynamically active fluid recirculating components exerting a forwarding action toward the space being sealed off and positioned on the conical surface of the primary sealing lip facing the auxiliary sealing lip.

6. The seal defined in claim 3, wherein the intermediate space is packed with grease.

7. The seal defined in claim 1, wherein the first sealing edges consist of two intersecting conical surfaces.

8. The seal defined in claim 1, wherein the angle bisectors of the conical surfaces demarcating the first sealing edges slope, in an opposite direction, compared to the angle bisectors of the conical surfaces demarcating the second sealing edges, relative to the longitudinal axis of the shaft.

* * * * *